United States Patent [19]

Elser

[11] 4,421,010

[45] Dec. 20, 1983

[54] STEERING GEAR FOR MOTOR VEHICLES

[75] Inventor: Dieter Elser, Essingen, Fed. Rep. of Germany

[73] Assignee: Zahnradfabrik Friedrichshafen, AG., Friedrichshafen, Fed. Rep. of Germany

[21] Appl. No.: 283,456

[22] Filed: Jul. 15, 1981

[30] Foreign Application Priority Data

Jul. 25, 1980 [DE] Fed. Rep. of Germany ....... 3028175

[51] Int. Cl.³ .............................................. F15B 9/10
[52] U.S. Cl. .................... 91/375 R; 180/146; 91/370
[58] Field of Search ................ 91/375 R, 375 A, 370, 91/372, 373; 180/146, 147, 148

[56] References Cited

U.S. PATENT DOCUMENTS

| 3,867,870 | 2/1975 | Shimoura et al. ............... 91/375 A |
| 4,034,825 | 7/1977 | Adams ............................. 91/375 A |
| 4,200,030 | 4/1980 | Elser ................................ 91/375 A |
| 4,373,598 | 2/1983 | Elser ................................ 91/375 A |

FOREIGN PATENT DOCUMENTS 1505333 11/1967 France .
1201976 8/1970 United Kingdom .

Primary Examiner—Paul E. Maslousky
Attorney, Agent, or Firm—Zalkind & Shuster

[57] ABSTRACT

A booster steering servomotor having a piston is pressurized and exhausted by a valve having a rotary valve plug within a valve sleeve and coacting flow control grooves wherein means for centering the rotary valve plug and steering mechanism of the vehicle wheels is effected by hydraulic power after a steering operation. Accordingly, little or no resort to axle geometry is required for such purpose thereby saving the energy normally utilized in the steering operation. Such energy expenditure has been necessary to put wheel restoring force in the axle geometry, e.g., due to inclination of king pins. In essence, the components effect rotation of the rotary valve plug during steering return in a direction to pressurize the servomotor pressure chamber which has been previously non-pressurized to bring the steering linkages back to straight ahead steering. The effect is achieved by increasing return bias energy stored in a fluid pressure chamber causing a return of the valve members, when steering force is released, beyond the neutral position for briefly reversely pressurizing the servomotor. The arrangement uses sleeve means having a cam action, which sleeve means are slotted for radial flexibility to take up play in the mechanism assembly.

18 Claims, 2 Drawing Figures

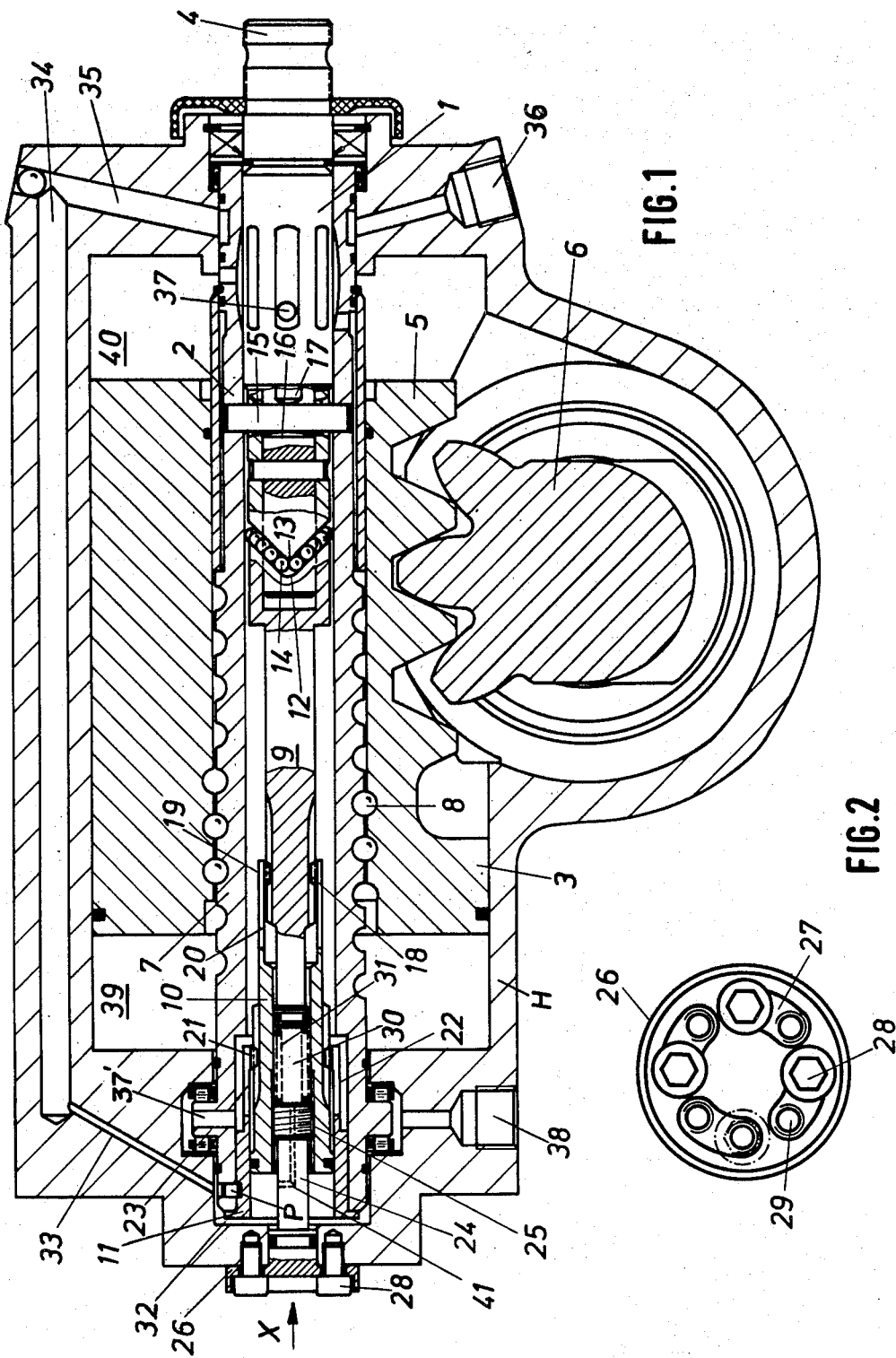

STEERING GEAR FOR MOTOR VEHICLES

BACKGROUND OF THE INVENTION

This application is hereby cross referenced to related applications, Ser. No. 283,470. filed July 15, 1981, Ser. No. 299,325, filed Sept. 4, 1981 and Ser. No. 493,289, filed Aug. 10, 1983, all assigned to the same assignee.

In my prior copending application Ser. No. 147,602, filed May 7, 1980, now U.S. Pat. No. 4,373,598 owned by the same assignee, there is disclosed a piston which returns rotary valve members to a neutral position under operating pressure. Thus, such a neutral return position is subjected during steering to the operating pressure in the pressure chamber to a servomotor adjacent to an end of the piston and which pressure acts on one face of the piston. In addition, a centering spring is utilized adding to the piston return force. These forces act through a cam device whereby rotating of a steering wheel by a vehicle operator is resisted by the pressure on the neutral return piston and the spring force, through the cam device to effect a simulated steering resistance of the vehicle wheels which are then being hydraulically powered.

Hydraulic boost is effected in the usual way by relative rotation between a rotary valve plug and the valve sleeve effected by the above-mentioned cam device. The relative rotation brings into action coacting grooves of the valve members for flow control of pressure and exhaust to the pressure chambers of a servomotor having a piston coupled by mechanical steering mechanism to vehicle wheels.

In such arrangements, the vehicle operator must exert a force to be stored in axle geometry; the additional force added in the course or steering brings the vehicle wheels back to straight ahead position. Accordingly, such systems require larger initial steering forces. The restoring forces for the vehicle wheels to straight ahead position is generally brought about by such axle geometry as, kingpin inclination.

Since in the steering operation a force over and above the necessary steering force must be added to store a return force in the axle geometry, initially larger steering forces have heretofore been required.

BRIEF DESCRIPTION OF THE PRESENT INVENTION

The present invention utilizes a construction wherein hydraulic servomotor power is used to return the vehicle wheels to straight ahead position, and such hydraulic power comes into play following the steering operation upon release of steering force. All or most of the restoring force may thus be effected by hydraulic power with little or no reliance on axle geometry. The construction utilizes a conventional rotary valve plug having relative rotation with a valve sleeve and contemplates mechanism whereby a known type of neutral return cam device is initially rotated during a steering operation so that V-shaped male and female cam members are relatively rotated primarily against the bias force produced by a neutral return pressurized bias piston, aided by a spring. This is initial neutral valve restoring energy. Such rotation of one cam member by the steering wheel through the rotary valve plug in one direction is increased by neutral valve restoring energy input during the steering operation by rotation of the valve sleeve acting on the other cam member rotationally in the opposite direction via a unique cam coupling to the pressurized bias piston. This is an additive relative rotational effect between the cam members. As a result a valve return movement to neutral after steering force is released at the steering wheel causes relative return rotation of the cam members with some overtravel beyond the neutral valve position. The valve members, i.e., the rotary valve plug and valve sleeve, are briefly reversed in position and reversely pressurize the piston of the sevomotor. Thus, the piston reverses the steered position of the vehicle wheels to bring them back to straight ahead position. This operation takes place briefly and ceases when the cam member of the rotary valve plug and the pressure bias piston have followed through on their relative rotation to be aligned once more whereat the valve members are in neutral position and the wheels remain in straight ahead position.

The effect is achieved by a combination of two coupling sleeves, one within the other, and the neutral return piston extending into the inner sleeve. The outer sleeve is keyed to the valve sleeve through the usual worm shaft of a conventional worm shaft and piston construction so that it rotates when the worm shaft rotates. However, the outer sleeve has a cam means connection with the inner sleeve which is slidably keyed to the neutral return piston for linear sliding guidance is also threadably connected to a fixed part of the servomotor housing. Accordingly, when the rotary valve plug attached to a steering wheel is rotated, it effects relative rotation with respect to the encompassing valve sleeve to pressurize and exhaust respective servomotor cylinder chambers. Continued rotation through a motion limiting pin in the usual manner effects rotation of the valve sleeve and the outer sleeve. Through the cam means connection betweeen the two sleeves, the inner sleeve is thus rotated, but being mounted on a threaded connection it moves axially during such rotation. Such axial motion causes the cam means connection to rotate the valve sleeve relative to the neutral return piston but in a direction opposite to the original steering rotational direction. Accordingly, the return motion piston now has an added degree of rotation which will produce return rotational movement of the neutral return cam members beyond that necessary to bring about neutral position of the valve members. This opposite directional additive rotation is caused by the axial movement of the inner sleeve having cam groove means which drives follower means on the outer sleeve.

Upon release of steering force, the neutral return piston rotates toward neutral position but is carried beyond such neutral position to reverse flow through the valve members and reversely pressurize the servomotor. Accordingly, the vehicle wheels are powered to straight ahead position while the valve is returned to neutral position. The degree of rotation of the neutral return piston is dependent upon the extent to which the steering wheel is turned.

The invention makes possible the use of smaller steering systems for larger or heavier vehicles. Accordingly, where a dual circuit steering arrangement might be necessary it can be eliminated. A further advantage is a saving in cost, weight and energy.

A detailed description of the invention now follows in conjunction with the appended drawings, in which:

FIG. 1 is a longitudinal section through a steering device of the invention having a ball-nut connection for force transmission between a piston and a gear sector and showing the essential components of the invention, and FIG. 2 is an end view in the direction "X" of FIG. 1, showing the end cover of the servomotor housing.

Referring to the drawing, a ball-nut type of hydraulic steering servomotor for a booster steering system is disclosed having a housing H wherein there is a rotary valve plug 1 encompassed by a valve sleeve 2 in conjunction with a servomotor cylinder and mechanical drive for steering vehicle wheels. The servomotor has a piston 3 having axial movement upon rotation of a steering spindle stub 4. The piston has an integral rack 5 engaging the gear sector 6.

A worm shaft 7 is disposed within piston 3 with the usual ball chain 8 between the piston and worm shaft.

The rotary valve plug 1 is integrally connected to the stub shaft 4 and the worm shaft 7 is integrally connected to the valve sleeve 2, and has mechanical connections to stub shaft 4, through a neutral return piston 9 movably keyed to an inner coupling sleeve 10 in turn movably keyed to an outer coupling sleeve 11 to which the worm shaft is pinned at P.

The sleeve 11 encompasses coupling sleeve 10 and the two sleeves connect worm shaft 7 with valve return piston 9.

At one end of return piston 9, adjacent rotary valve plug 1, a V-shaped cam 12 is provided to coact with a complementary V-shaped cam 13 at the end of the rotary valve plug 1. A series of ball bearings 14 are disposed intermediate the complementary V-shaped cams. The arrangement of the cams effects a centering for neutral position of the rotary valve plug 1 and the valve sleeve 2.

A cross pin 15 extends between rotary valve plug 1 and valve sleeve 2 for a bearing therebetween and for positioning the two valve members axially with respect to each other, wherein pivot members 16 and 17 within the rotary valve plug 1, which is tubular, ensure proper positioning axially. It will be understood that the cross pin 15 is a motion limiting pin between the valve members for limiting relative rotation motion therebetween in the operation of the valve as heretofore known in the art.

The pin 15 is fixed the valve sleeve 2, which is a part of the worm shaft 7. The valve plug 1 is rotatable within a determined control travel in relation to the valve sleeve 2. This control travel is obtained by means of the pin 15, extending through a bore in the valve plug 1. The bore in the valve plug 1 is slightly larger than the diameter of the pin 15. The relative motion limited by the pin 15 and the bore accomodates the operational relative displacement of the control grooves of the valve plug 1 and valve sleeve 2.

The inner sleeve 10 connects to the return piston 9 by protuberance means, e.g., teeth such as 18, slidable in coacting groove means as shown in piston 9 wherein the respective grooves are longitudinal and provide for a linear axial motion of the sleeve 10. Other types of slidable keyway arrangements are, of course, usable, such as springs and grooves, etc. Only axial motion is possible for the sleeve 10 relative to piston 9 although there is a rotational relationship between the two sleeves 10 and 11 by virtue of a cam means comprising protuberance means such as teeth 21 on sleeve 11 protruding into inclined groove means of sleeve 10.

For the purpose of absorbing any radial play, the inner guide sleeve 10 is provided with a tubular extension 19 in the region of teeth 18 having a plurality of slots 20 which afford flexible but compressive radial forces to stabilize the construction and to compensate for any radial play which may be present. The slots, as can be seen, extend longitudinally and will be understood to be peripherally spaced in suitable design to take care of any play conditions which might be met in any particular application.

As aforementioned, the outer sleeve 11 is fastened at the pin P to the worm shaft 7 and effects a cam means with the inner sleeve 10 by provision of teeth 21 acting in inclined grooves on the periphery of sleeve 10. Thus the two sleeves form a cam motion coupling means between the worm shaft 7 and the return piston 9.

As described for the sleeve 10, the sleeve 11 also has slots 23 circumferentially arrayed and extending longitudinally in a tubular extension 22 or the sleeve for removal of radial play and stabilizing the assembly by way of compressive flexibility provided by the slotted arrangement. Although teeth 21 have been shown, it will be understood that the cam means may take the form of any other kind of helical gearing involving cams or pins, etc., arrayed peripherally to cooperate with respective grooves wherein such cam elements may be in the sleeve 10 and the grooves within the worm shaft 7. As shown, sleeve 10 is, in effect, a drum cam.

The lower end of the servomotor housing is provided with a set screw 24 engaging a thread 25 within the inner wall of the sleeve 10. The set screw thus extends into the interior of the sleeve 10 and forms an integral part of a fixed but adjustable cover 26 which closes the housing.

The cover 26 is rotatably adjustable by means of elongated slots 27 through which pass respective screws 28 which fasten into tapped bores in the end of the housing. Accordingly, rotation of cover 26 can effect axial movement of coupling sleeve 10 which acting through the cam means between the coupling sleeves can effect relative rotation to an adjusted neutral position.

Moreover, in order to double the amount of adjustment, the housing is also provided with a further set of tap bores 29 so that the screws 28 can be set thereinto whereby it will be seen adjustment for double the arcuate distance of the slots 27 is possible.

A pressure chamber 30 within sleeve 10 is provided intermediate the face of the set screw 24 and the end of return piston 9 within the sleeve for pressurizing that piston to neutral valve position. The chamber contains a centering spring 31 compressed between the face of set screw 24 and that end of return piston 9 biasing cam members 12, 13 to neutral valve position in conjunction with pressure in chamber 30. Chamber 30 connects with the inlet port 36 so that there is fluid pressure in chamber 30 at all times, communication being via a passage 41 in set screw 24, an annular chamber 32 and bores 33, 34 and 35. The foregoing pressurized fluid flow path to chamber 30 from inlet source 36 is, as shown, in parallel with the flow path to servomotor chambers 39 and 40 established by the passages in the valve plug 1 and valve sleeve 2.

Accordingly, the pressure of the fluid chamber 30 is affected by regulation of the working pressure in fluid chambers 39 or 40 to act as an additional hydraulic reaction force, which gives a steering response at the steering wheel.

Exhaust return for the servomotor to port 38 is effected in the usual way via a cross bore 37 from the interior of the rotary valve plug 1 through the interior of worm shaft 7 and a cross bore 37' at the end thereof.

The housing is divided by the piston 3 for servomotor purposes into pressure chambers 39 and 40.

OPERATION

Hydraulic boost is accomplished in the usual way upon rotation in either direction of the steering stub shaft 4 as by a steering wheel (not shown) which initially effects relative rotation between the rotary valve plug 1 and valve sleeve 2 up to the limit determined by the arrangement of the pin 15 and against the camming action of the cam members 12, 13, biased toward each other by spring 31 and the pressure in the chamber 30. Thus, pressure fluid to either chamber 39 or 40 with exhaust of the other chamber occurs by coaction of the grooving in the valve members and the various passages hereinabove described.

Due to the fact that the chamber 30 connects at any time with a pressure chamber 39 or 40, the pressure in such chamber always acts on the return piston 9. Accordingly, the force of this operating pressure is added to the force of the centering spring 31 to exert a neutral position restoring force via the cams 12, 13 on the rotary valve plug 1, and thus upon a steering wheel connecting to the stub shaft 4. In such manner, a simulated steering response is felt by the vehicle operator.

During a steering movement, relative rotation occurs between valve members 1, 2 to the limited imposed by pin 15, since valve sleeve 2 is initially held stationary by vehicle wheel resistance to turning. Hydraulic boost is then in effect and continued rotation at the steering wheel rotates both valve members 1, 2 in unison via pin 15.

Accordingly, stub shaft 4 and return piston 9 are rotated, the sleeve 10 due to the threaded connection 25 will move axially in one direction or the other, depending on the directin of stub shaft rotation. Because the sleeve 11 is fixed to the worm shaft 7 and the teeth 21 thereof are received in inclined or helical cam grooves of the sleeve 10, the sleeve 10 is caused to rotate against rotation of the stub shaft 4. For this reason the sleeve 10 receives a prestressing force depending on the rotation of the steering wheel.

Accordingly, the cam grooves in sleeve 10, suitably slanted, acts against cam follower teeth 21 of sleeve 11 to simultaneously rotate sleeve 10 relative to sleeve 11 and thus relative to worm shaft 7. This rotation of sleeve 10 relative to worm shaft 7 is in a direction opposite to the direction of rotation effected by the rotation of stub shaft 4. Due to the sliding keyway connection between sleeve 10 and piston 9, relative rotation occurs between piston 9 and worm shaft 7. This increases the relative rotation of rotary valve plug 1 and valve sleeve 2, against the valve return force transmitted through cams 12, 13, under 13 now increased in rotation between their V-shaped surfaces the pressure in chamber 30 aided by compression spring 31. This is an increase in the stored energy for returning the valve to neutral position due to compression of spring 31 with the pressure in chamber 30 remaining constant.

The increase in stored energy exceeds that which would normally be required to bring the valve members exactly back to a neutral position after release or steering force on stub shaft 4.

The result is that when such steering force is released, the rotary valve plug 1 is rotated in a direction opposite from that of the return piston 9 effected by the sliding key connection via teeth 18 beyond the neutral position to produce a brief reverse flow to the servomotor. Accordingly, the pressure chamber which has just been exhausted is now briefly pressurized and operates the piston in the reverse direction so that by hydraulic power the vehicle wheels are returned to straight ahead position.

What has just been described for bringing about neutral position in place of a torque rod will be understood to have versatility for design of the cam means such that any desired characteristic of return can be achieved. Thus, the amount of opposite rotation may be predetermined as a matter of cam shapes or any suitable helical gearing. For example, the arrangement can be such so as to provide a disproportionate degree of opposite rotation in the course of a steering action in order to get an improved centering characteristic.

It will be also be noted that the thread 25 may be disposed at any suitable point in the assembly if so desired. The only essential is that it remain fixed so as to cause axial movement of the sleeve 10 in one direction or the other, whereby the camming action of teeth 21 acting in grooves of sleeve 10 will have the effect of causing axial and linear movement by virtue of the guide means provided by teeth 18 in order to cause the requisite opposite rotation of the return piston 9 to a porportional degree or beyond a proportional degree, if so desired.

The invention is usable not only for a ball-nut system as described, but also for a hydraulic rack and pinion steering system.

What is claimed is:

1. In a booster steering system including a housing H, a double acting servomotor in said housing and a flow control valve in said housing having relatively rotatable valve members (1 and 2) with coacting passages for operating said servomotor, a neutral return mechanism comprising relatively rotative cam members (12, 13), one of the cam members (13) being secured to one of said valve members (1), neutral return biasing means (9) secured to the other of the cam members (12) for biasing said cam members to center said valve members in a neutral position, wherein relative rotation between said cam members stores energy for return of said valve members to the neutral position in response to relative rotation between said valve members causing relative rotation of said cam members;

the improvement residing in said neutral return mechanism including:

an outer coupling sleeve (11) secured to said other of the valve members (2);

an inner coupling sleeve (10) within said outer sleeve;

a threaded connection (25) between said inner coupling sleeve and said housing and a linear sliding keyed connection (18) between said inner coupling sleeve and said biasing means (9) whereby rotation of said inner coupling sleeve effects axial movement thereof on said threaded connection;

interacting cam means (21) carried by said coupling sleeves for rotation of said outer coupling sleeve by said other of the valve members to effect rotation of said inner sleeve with said biasing means in response to said axial movement in a rotative direction opposite to the direction of rotation of said one of the valve members to increase the relatively rotated position of said cam members (12, 13) and increase return bias beyond that needed for return of said valve members to the neutral position so that, upon release of steering force on said one of the valve members, said valve members overtravel beyond the neutral position to reversely pressurize said servomotor to return the wheels of a vehicle to straight ahead position.

2. In a booster steering system as set forth in claim 1, wherein said linear sliding keyed connection comprises longitudinal groove means on said biasing means engaged by tooth means (18) carried by said inner coupling sleeve.

3. In a booster steering system as set forth in claim 1, wherein said threaded connection (25) is comprised of a threaded member (24) secured to said housing and a thread within said inner sleeve engaging said threaded member extending thereinto.

4. In a booster steering system as set forth in claim 3, including a cover (26) for said housing, said threaded member (24) being secured thereto.

5. In a booster steering system as set forth in claim 4, including means (27, 28) for securing said cover to said housing to permit rotative adjustability of said threaded member 24 and adjustably rotate said inner coupling sleeve causing axial movement thereof to effect rotation of said other of the valve members.

6. In a booster steering system as set forth in claim 5, wherein said securing means comprises arcuate slot means (27) in said cover and screw means (28) therethrough into said housing.

7. In a booster steering system as set forth in claim 1, wherein said threaded connection (25) is comprised of a threaded member (24) secured to said housing and a thread within said inner sleeve engaging said threaded member extending thereinto, said housing having a pressure port (36);
said threaded member (24) being provided with a passage (41) and pressure passages (33, 34, 35) in said housing communicating therewith and with said pressure port;
said biasing means comprising a neutral return piston (9) having an end secured to said other of the cam members (12);
said inner sleeve (10) having a pressure chamber (30) and the other end of the aforesaid piston extending therein;
the aforesaid chamber being constantly pressurized through said passage in said threaded member whereby said return bias on said cam members (12, 13) towards the neutral position is maintained.

8. In a booster steering system as set forth in claim 1, including means imparting to said coupling sleeves radial flexibility for absorbing radial play in assembly with said biasing means and with each other;
said biasing means including a neutral return piston (9) internally of said inner coupling sleeve (10).

9. In a booster steering system as set forth in claim 8, wherein the radial flexibility means of said coupling sleeves is formed by peripherally spaced longitudinal end slots.

10. In a booster steering system as set forth in claim 9, said slots being formed in a tubular extension (19, 22) of each of said coupling sleeves.

11. In a booster steering system as set forth in claim 10, the linear sliding key connection being formed by longitudinal groove means in said neutral return piston (9) and coacting tooth means (18) carried by said inner coupling sleeve (10).

12. In a booster steering system as set forth in claim 10, wherein the cam means includes helical groove means on the inner coupling sleeve (10) and coacting tooth means (21) carried by said outer coupling sleeve.

13. In a booster steering system as set forth in claim 9, said slots being formed in a tubular extension (19, 22) of each of said coupling sleeves;
the linear sliding key connection being longitudinal groove means on said neutral return piston (9) and coacting tooth means (18) carried by said inner coupling sleeve (10);
the cam means including helical groove means on the inner coupling sleeve (10) and coacting tooth means (21) carried by said outer coupling sleeve;
said tooth means of said coupling sleeves being carried on the respective tubular extension (19, 22).

14. In a booster steering system as set forth in claim 13,
a worm shaft (7) connected to said other of the valve members (2) and extending through said housing and being connected to said outer coupling sleeve (11);
the servomotor having a piston (5) in said housing, said worm shaft extending therethrough and a ball nut (8) connection between the piston and the worm shaft.

15. In a booster steering system as set forth in claim 1, said outer coupling sleeve (11) having a radially flexible slotted tubular extension;
said cam means having tooth means adjacent a free end of said tubular extension.

16. In a booster steering system as set forth in claim 1, said inner coupling sleeve (10) having a radially flexible slotted tubular extension;
said linear sliding keyed connection having tooth means adjacent a free end of said tubular extension.

17. In a fluid power steering system having a steering spindle (4), a source (36) of pressurized fluid, a fluid servomotor (3), a member (7) driven by the servomotor, valve means (1-2) resposive to manual displacement of the spindle to a displaced position from a neutral position relative to the driven member for pressurizing the servomotor from said source to power the servomotor in a corresponding operational direction, and energy storing means operatively connected to the spindle and the driven member for exerting a restoring force resisting said displacement of the spindle from the neutral position, the improvement residing in powering the servomotor in a reversed operational direction upon release of the steering spindle from the displaced position, comprising a coupling element (10) operatively connected to the energy storing means and the driven member, means (25) responsive to the rotation of the driven member for displacing the coupling element relative to the driven member, and cam means (21) responsive to said relative displacement of the coupling element for increasing the restoring force as a function of said manual displacement of the spindle to effect overtravel return movement thereof beyond the neutral position and briefly power the servomotor in the reversed operational direction, said energy storing means including pressure chamber means (3) connected to said source for generating said restoring force.

18. The system as defined in claim 17 wherein said energy storing means further includes a return piston (9) axially splined to the coupling element and extending into the pressure chamber means, and operatively engaged cam members (12, 13) respectively secured to the return piston and the steering spindle.

* * * * *